(12) United States Patent
Juchem et al.

(10) Patent No.: US 6,663,038 B2
(45) Date of Patent: Dec. 16, 2003

(54) SAFETY BELT RETRACTOR HAVING A ROTATION DAMPENER

(75) Inventors: Alois Juchem, Petershausen (DE); Andreas Lucht, Horst (DE); Geert Helge Wittenberg, Hamburg (DE)

(73) Assignee: Autoliv Development AB (CH)

( * ) Notice: Subject to any disclaimer, the term of this patent is extended or adjusted under 35 U.S.C. 154(b) by 0 days.

(21) Appl. No.: 10/203,701

(22) PCT Filed: Feb. 7, 2001

(86) PCT No.: PCT/EP01/01316
§ 371 (c)(1), (2), (4) Date: Aug. 9, 2002

(87) PCT Pub. No.: WO01/58728
PCT Pub. Date: Aug. 16, 2001

(65) Prior Publication Data
US 2003/0010860 A1 Jan. 16, 2003

(30) Foreign Application Priority Data
Feb. 9, 2000 (DE) .......................... 100 05 636

(51) Int. Cl.⁷ .............................................. B65H 75/30
(52) U.S. Cl. ..................... 242/381; 242/396; 188/290
(58) Field of Search ................ 242/381, 396; 280/806, 807; 297/478; 188/290

(56) References Cited
U.S. PATENT DOCUMENTS

| 4,232,836 | A | * | 11/1980 | Fohl ......................... 280/807 |
| 4,385,775 | A | * | 5/1983 | Shimogawa et al. ......... 280/806 |
| 4,446,884 | A | * | 5/1984 | Rader, Jr. ................... 242/381 |
| 4,815,674 | A | * | 3/1989 | Blake et al. ................. 242/381 |
| 4,908,905 | A | * | 3/1990 | Kanno et al. ................ 188/290 |
| 5,794,878 | A |   | 8/1998 | Carpenter et al. |
| 6,234,417 | B1 | * | 5/2001 | Sauder et al. ............... 242/381 |

FOREIGN PATENT DOCUMENTS

| GB | 1 440 232 | 6/1976 |
| GB | 2 330 338 | 4/1999 |

OTHER PUBLICATIONS

JP 11334531, Patent Abstracts of Japan.

* cited by examiner

Primary Examiner—William A. Rivera
(74) Attorney, Agent, or Firm—R W Becker & Associates; R W Becker

(57) ABSTRACT

A safety belt retractor is provided as a safety system in motor vehicles. The belt shaft is mounted in a U-shaped housing and serves as a carrier for a belt strap wound thereon. A rotation dampener is provided as a force limiting element and acts upon the belt shaft. The rotation dampener comprises: a cylindrical housing filled with a highly viscous medium, at least one apertured disk fixedly disposed in the cylindrical housing, and at least one disk piston disposed in the cylindrical housing parallel to the apertured disk, wherein the disk piston is fixedly connected to the belt shaft, the rotation of which is to be dampened, and wherein the disk piston is provided with a radially extending piston wing that rotates upon rotation of the disk piston.

8 Claims, 3 Drawing Sheets

SAFETY BELT RETRACTOR HAVING A ROTATION DAMPENER

BACKGROUND OF THE INVENTION

The invention relates to a safety belt retractor as a safety system in motor vehicles with, as a carrier of the belt strap wound thereon, a belt shaft mounted in a U-shaped housing, and with, as a force limiting element, a rotation dampener that acts upon the belt shaft.

A safety belt retractor having the aforementioned features is described in GB-PS 1 440 232. In this connection, there is disposed in the interior of the hollow shaft body of the belt shaft a piston that is axially displaceable upon a threaded rod and that at an end face is introducible into a working space that is filled with a highly viscous medium, and in its axial longitudinal direction is provided with transfer channels via which the medium that is displaced out of the working space and during introduction of the piston can flow off. The piston is coupled with the shaft body, while the threaded rod is connected with the blocking system of the belt retractor. Therefore, if during locking of the belt retractor a further tensioning of the belt strap occurs, and a rotation of the shaft body connected therewith, the piston is axially displaced upon the threaded rod, and the desired force limitation is thus effected via the displacement of the medium out of the working space.

The known rotation dampener has the drawback that the introduction of the viscous medium into the rotation dampener, as well as the sealing of the receiving chamber in the interior of the belt shaft are difficult, and it is therefore an object of the present invention to provide a rotation dampener for a safety belt retractor of the initially mentioned type that has a simplified construction, even as an independent subassembly that can be pre-assembled.

SUMMARY OF THE INVENTION

The realization of this object, including advantageous embodiments and further developments of the invention, result from the content of the patent claims that follow this description.

The basic concept of the invention is that the rotation dampener comprises a cylindrical housing that is filled with a highly viscous medium and that has at least one apertured disk fixedly disposed therein, and in the housing, parallel to the apertured disk, is disposed a disk piston that is fixedly connected with the belt shaft, the rotation of which is to be dampened, and that has a radially extending piston wing that rotates upon rotation of the disk piston. The invention has the advantage that during the rotation of the disk piston relative to the apertured disk there is no displacement or overflow of the medium, but rather that the shearing forces that result between the two disks (apertured disk and disk piston) that rotate relative to one another are utilized for the force limitation.

As one exemplary embodiment for the utilization of an inventive rotation dampener in a safety belt retractor, the invention is initially directed to flanging the housing laterally on the housing of the safety belt retractor, with the disk piston being connected to the belt shaft. To the extent that such a safety belt retractor already has a force limiting device in the form of a torsion rod that is connected with the belt shaft, it can be provided that the disk piston be connected with the torsion rod as an additional force limiting element.

Alternatively, the rotation dampener can be integrated into the shaft body of the belt shaft, which shaft body is for this purpose hollow, whereby in the shaft body, as a carrier of the apertured disk that is interlockingly disposed thereon, there is disposed a shaft core that is locked when the safety belt retractor is blocked, and the disk piston is connected to the shaft body via an interlocking connection.

Pursuant to specific embodiments of the invention, a plurality of disk pistons and apertured disks can be provided in an alternating arrangement, and/or a respective spacer disk can be disposed between disk pistons and apertured disks.

A silicone is preferably used as highly viscous medium. For the general increase of the force level of the force limiter, and to compensate for a possible drop in force at higher temperatures, it can be provided that the silicone is already under increased pressure prior to the activation of the force limitation. This can be brought about by filling the silicone into the housing at an appropriately high pressure.

BRIEF DESCRIPTION OF THE DRAWINGS

The drawings show embodiments of the invention that will be described subsequently. The drawings show.

DESCRIPTION OF PREFERRED EMBODIMENTS

Figure 1:
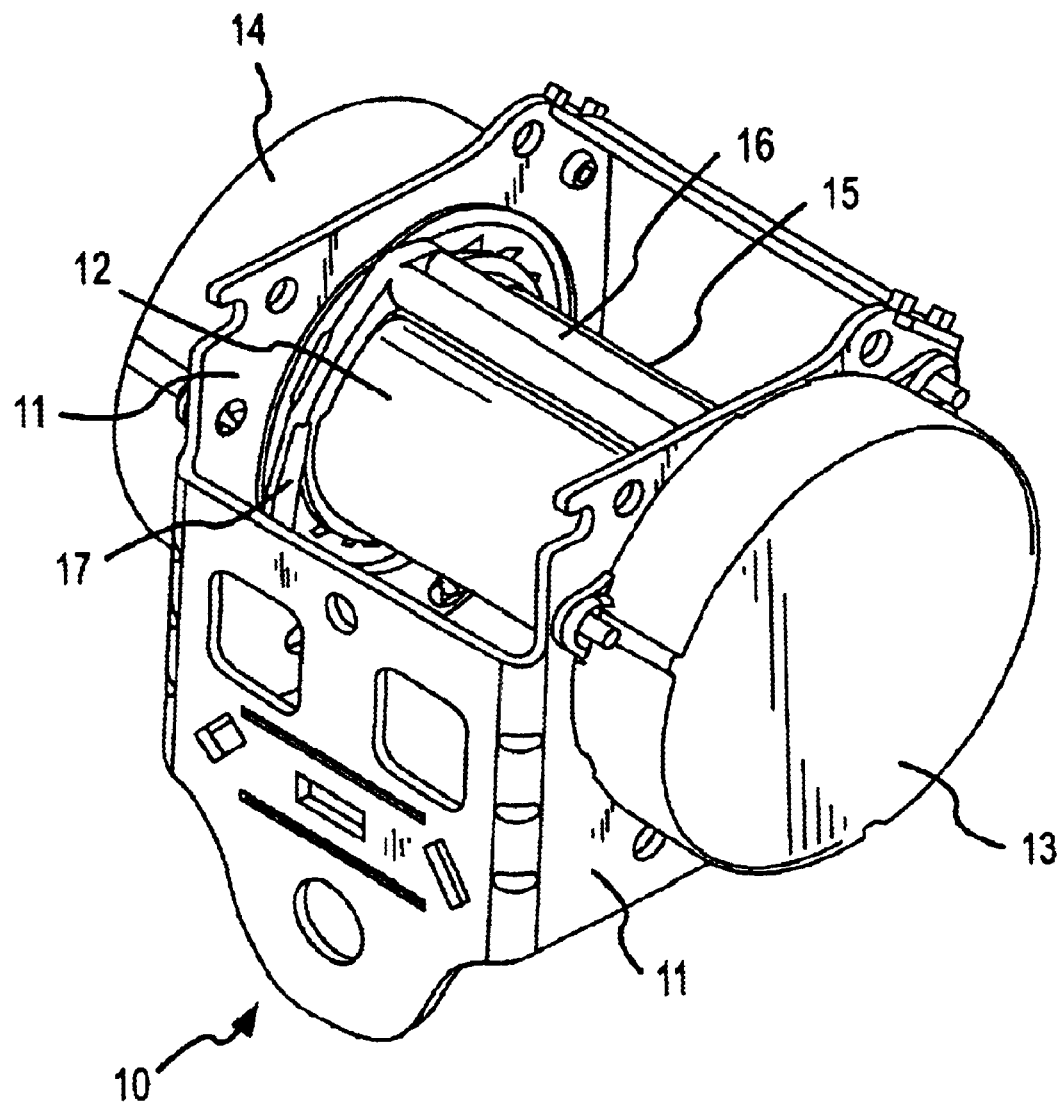
FIG. 1 a perspective overall view of a safety belt retractor.

The safety belt roll-up device or retractor 10 illustrated in its entirety in FIG. 1 has a U-shaped belt retractor housing with associated U-legs 11; rotatably mounted in the two U-legs 11 is a belt shaft 12 upon which, or from which, a non-illustrated belt strap can be wound or unwound. For this purpose, one end of the belt shaft 12 is acted upon by a control and blocking system that is covered by a system cap 14, while the other end of the belt shaft 12 is acted upon by a belt wind-up spring that is disposed under a spring cap 13. Pivotably mounted on the U-legs 11, on suitable arms 17, is a belt guide 15 that has a guide slot 16 for extending about the non-illustrated belt strap that is guided therethrough, so that the belt strap can be wound onto or unwound from the belt shaft 12 without distortion. To this extent, such a construction of a safety belt retractor 10 is part of the state of the art and FIG. 1 does not yet show any features of the invention.

Figure 2:
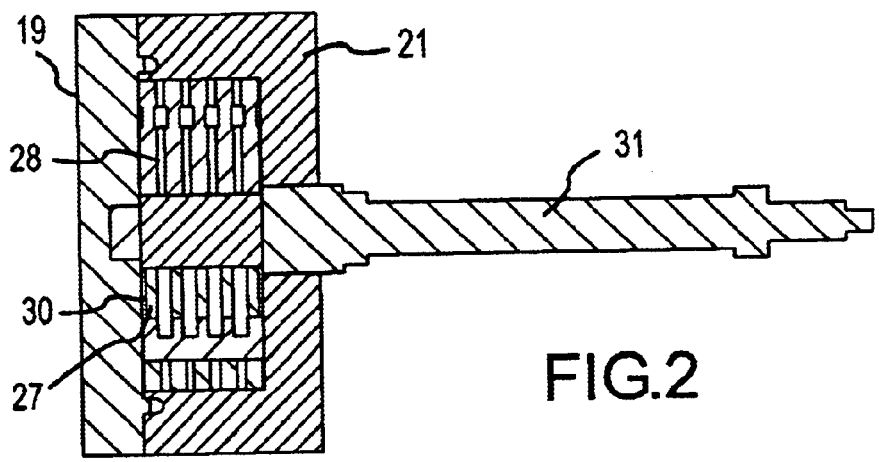
FIG. 2 a cross-sectional view of an embodiment of the rotation dampener in the assembled state installed in a safety belt retractor, FIG. 3 the subject matter of FIG. 2 in a different manner of representation, FIG. 4 a partially cross-sectioned view of a further embodiment of the rotation dampener integrated into a belt shaft.
Figure 3:
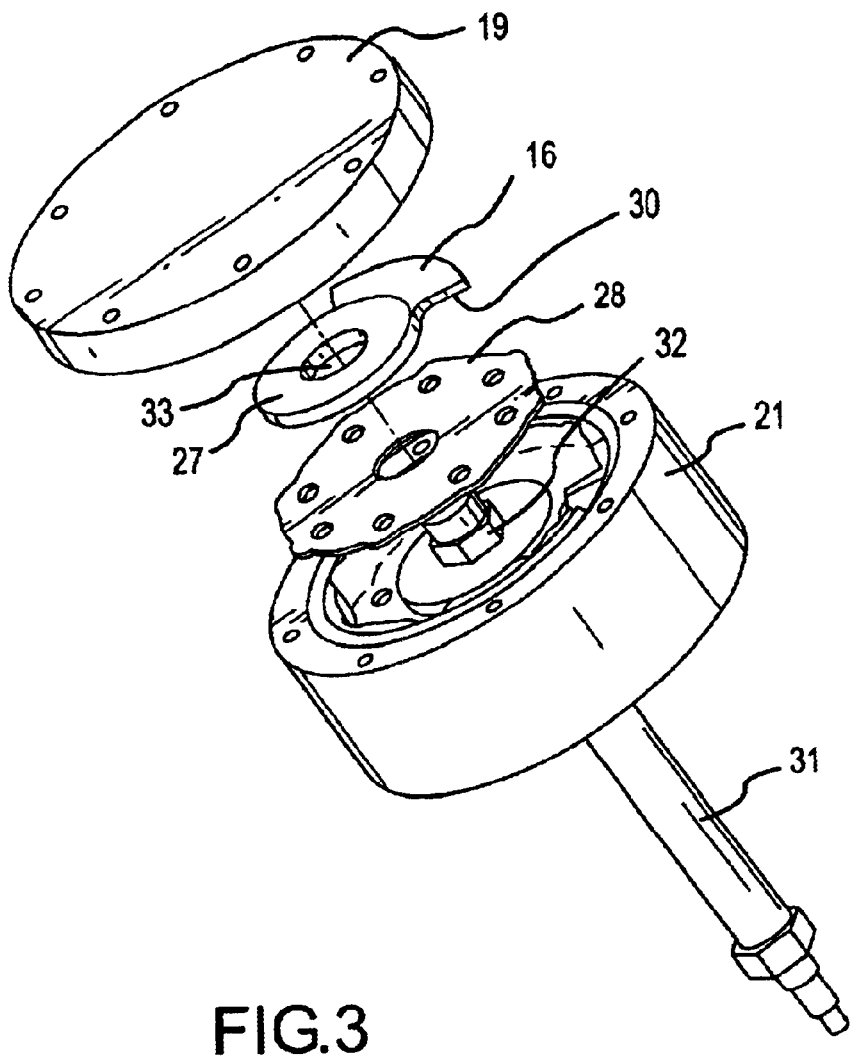
Figure 4:
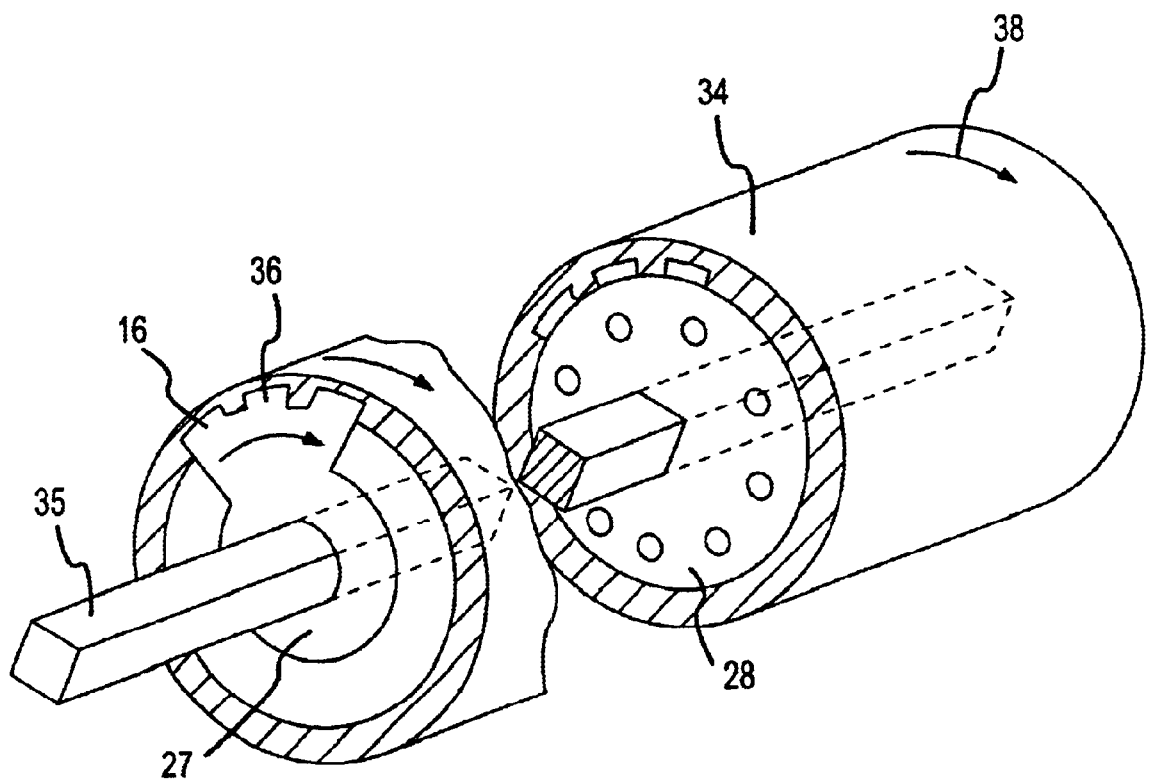

With the embodiments illustrated in detail in FIGS. 2 to 4 of the connection of an inventive rotation dampener to the belt shaft of the safety belt retractor, there is respectively disposed in a housing 21, which is filled in particular with silicone as highly viscous medium, a fixed apertured disk 28, across from which is associated a disk or ring piston 27 that is provided with a radially extending piston wing 16. Since the disk piston 27 is fixedly connected with the component that is to have its rotation dampened, there result with the embodiments of FIGS. 2 to 4, between the disk pistons 27 and the associated apertured disks 28 that are rotatable relative to one another, appropriate shearing forces, since the highly viscous medium, preferably silicone, that is between the disks experiences a pressure application due to the disk piston 27 and may be compressed and ground between the disk surfaces. The holes disposed in the apertured disks 28 serve for pressure equalization between the individual disks, and enable a uniform filling of the housing with silicone. As can be seen from FIG. 3, a plurality of disk pistons 27 and apertured disks 28, which are alternatingly arranged relative to one another, are preferably provided.

In detail, FIGS. 2 and 3 show an embodiment according to which the cylindrical housing 21 is connected to the outer side of the belt retractor housing and is coupled with the shaft of the belt retractor or with an associated torsion rod. In this connection, the respective apertured disks 28 are non-rotatably fixed in position in the cylindrical housing 21, while the disk pistons 27, via a profiled mounting opening 33, are placed upon a profiled portion 32, having a corresponding shape, of a shaft core 31 of the belt shaft 12, so that when the belt shaft 12 rotates, and hence the shaft core 31 rotates as a component of the belt shaft 12, the rotation of the belt shaft 12 is dampened.

In contrast, the embodiment illustrated in FIG. 4 shows the integration of the rotation dampener, which can be seen in detail from FIGS. 2 and 3, into the interior of the belt shaft, which has a hollow shaft body 34. Extending through the shaft body 34 is the shaft core, which in this embodiment is designated 35 and that is connected to the blocking system of the pertaining safety belt retractor. In this connection, the apertured disks 28 are disposed upon the profiled shaft core 35, while the disk pistons 27 are rotatably disposed upon the shaft core 35 yet via interlocking structures 36 are connected with the shaft body 34 in a positively engaging manner. If during the blocking state of the belt retractor the shaft core 35 becomes immobilized, and if the shaft body 34 rotates further due to the tension of the belt strap in the direction of the arrow 38, the disk pistons 27 rotate along with it due to the interlocking connection 36 between disk pistons 27 and shaft body 34, while the apertured disks 28 remain stationary. This results in the production of the desired shearing forces.

The features of the subject matter of these documents disclosed in the preceding description, the patent claims, the abstract and the drawing can be important individually as well as in any desired combination with one another for the realization of the invention in its various embodiments.

The specification incorporates by reference the disclosure of German priority document 100 05 636.9 filed Feb. 9, 2000 and International priority document PCT/EP01/01316filed Feb. 7, 2001.

The present invention is, of course, in no way restricted to the specific disclosure of the specification and drawings, but also encompasses any modifications within the scope of the appended claims.

What is claimed is:

1. A safety belt retractor as a safety system in motor vehicles, comprising:

a U-shaped housing;

a belt shaft mounted in the U-shaped housing and serving as a carrier for a belt strap wound thereon;

a rotation dampener, as a force limiting element, that acts upon said belt shaft, wherein said rotation dampener comprises:

a) a cylindrical housing filled with a highly viscous medium;

b) at least one apertured disk fixedly disposed in said cylindrical housing; and c) at least one disk piston disposed in said cylindrical housing parallel to said apertured disk, wherein said at least one disk piston is fixedly connected to said belt shaft the rotation of which is to be dampened, and wherein at least one disk piston is provided with a radially extending piston ring that rotates upon rotation of said at least one disk piston.

2. A safety belt retractor according to claim 1, wherein said cylindrical housing is flanged laterally onto said U-shaped housing of said safety belt retractor, and wherein said at least one disk piston is connected with said belt shaft.

3. A safety belt retractor according to claim 2, wherein a torsion rod is provided that operates as a force limiting device and is connected to said belt shaft, and wherein said at least one disk piston is connected with said torsion rod.

4. A safety belt retractor according to claim 1, wherein said cylindrical housing is formed by a shaft body of said belt shaft, wherein said at least one apertured disk and said at least one disk piston are disposed in said shaft body, wherein provided in said shaft body is a shaft core as carrier for said at least one apertured disk, which is positively disposed thereon, wherein said shaft core is locked if said safety belt retractor is blocked, and wherein said at least one disk piston is connected to said shaft body via an interlocking connection.

5. A safety belt retractor according to claim 1, wherein a plurality of disk pistons and apertured disks are disposed in an alternating sequence in said housing of said rotation dampener.

6. A safety belt retractor according to claim 1, wherein a respective spacer element is disposed between said at least one disk piston and said at least one apertured disk.

7. A safety belt retractor according to claim 1, wherein said cylindrical housing is filled with a silicone as highly viscous medium.

8. A safety belt retractor according to claim 7, wherein said silicone that is filled into said housing is already at an increased pressure prior to an activation of force limitation by said rotation dampener.

\* \* \* \* \*